United States Patent [19]

Topliss et al.

[11] Patent Number: 4,888,704
[45] Date of Patent: Dec. 19, 1989

[54] ADVANCED CONTROL STRATEGIES FOR MELT FLOW RATE AND REACTOR CONCENTRATION IN THE POLYPROPYLENE SLURRY PROCESS

[75] Inventors: Robert J. Topliss, Naperville; Norman F. Brockmeier, Wheaton; Harold A. Lindahl, Riverside, all of Ill.

[73] Assignee: Amoco Corporation, Chicago, Ill.

[21] Appl. No.: 134,854

[22] Filed: Dec. 18, 1987

[51] Int. Cl.[4] .................. G06F 15/46; G05D 7/00
[52] U.S. Cl. ............................. 364/500; 364/510; 364/502
[58] Field of Search ........... 364/496, 497, 500, 502, 364/558, 557, 565, 510; 526/59, 60

[56] References Cited

U.S. PATENT DOCUMENTS

| | | | |
|---|---|---|---|
| 3,146,223 | 8/1964 | Cheney | 526/59 |
| 3,225,023 | 12/1965 | Hogan et al. | 526/60 |
| 3,290,116 | 12/1966 | Carroll | 364/500 |
| 3,594,559 | 7/1971 | Pemberton | 364/500 |
| 3,614,682 | 10/1971 | Smith | 364/500 |
| 3,800,288 | 3/1974 | Russell et al. | 364/200 |
| 4,448,736 | 5/1984 | Emery et al. | 364/502 |
| 4,491,924 | 1/1985 | Agarwal | 364/557 |
| 4,628,034 | 12/1986 | Hofferber | 526/59 |
| 4,742,131 | 5/1988 | Asanuma et al. | 364/500 |
| 4,742,472 | 5/1988 | Sugimori et al. | 364/500 |

Primary Examiner—Parshotam S. Lall
Assistant Examiner—Christopher L. Makay
Attorney, Agent, or Firm—Wallace L. Oliver; William H. Magidson; Ralph C. Medhurst

[57] ABSTRACT

The control strategies include controlling the slurry concentration (SCON) by making an energy balance calculation around a slurry reactor and a material balance of liquid in, and liquid and solids out, of the reactor to determine the SCON. The feed rate of a diluent (hexane) stream into the reactor is adjusted to cause the SCON to approach or be at a target SCON. Further the control strategies include controlling the melt flow rate (MFR) by measuring the temperature and pressure in the slurry reactor and by gas chromatography, determining the ratio of hydrogen to propylene, calculating the MFR from a correlation developed from polypropylene process results from these parameters and then adjusting the feed rate of a hydrogen stream into the reactor to cause the MFR to approach or be at a target MFR which will yield a desired product of polypropylene.

13 Claims, 7 Drawing Sheets

ADVANCED CONTROL STRATEGIES FOR MELT FLOW RATE AND REACTOR CONCENTRATION IN THE POLYPROPYLENE SLURRY PROCESS

BACKGROUND OF THE INVENTION

1. Field of the Invention

The present invention relates to a method and apparatus for controlling the molecular structure or melt flow rate of the polypropylene produced from a reactor in a polypropylene slurry process and for controlling the reactor slurry concentration to maximize the capacity of the process and reduce the solvent recovery cost.

Two important variables in the polypropylene (PP) slurry process are melt flow rate (MFR) and reactor slurry concentration (SCON). It is very difficult, if not impossible, to measure MFR and SCON directly in a slurry reactor. Therefore, it is difficult to control the process variables using conventional control strategies. Presently, MFR and SCON are controlled by manually adjusting process variables that can be measured directly.

As will be described in greater detail hereinafter, the advanced control strategies of the present invention utilize an on-line process simulation program to monitor and control MFR and SCON and by improving MFR and SCON control, improved product quality, maximized capacity and reduced solvent recovery costs, are obtained.

2. Description of the Prior Art

Heretofore various control strategies for controlling the melt flow rate and reactor slurry concentration in a polypropylene slurry process have been proposed. Examples of such prior control strategies are set forth in the following U.S. patents:

| U.S. Pat. No. | Patentee |
|---|---|
| 3,087,917 | Scoggin |
| 3,250,757 | Smith et al |
| 3,257,363 | Miller et al |
| 3,356,667 | Smith et al |
| 3,476,729 | Smith et al |
| 3,492,283 | Miller |
| 3,551,403 | Delbouille et al |
| 3,614,682 | Smith |
| 3,951,604 | Smith et al |
| 3,998,995 | Buss et al |
| 4,469,853 | Mori |

The Scoggin U.S. Pat. No. 3,087,917 discloses a polymerization process which uses a diluent and produces a solid polymer in particle form suspended in a slurry in a polymerization vessel. The slurry is maintained at a desired temperature by taking a portion of the diluent separated from the slurry, cooling the diluent portion, returning it to the vessel and controlling the temperature of the cooled, reintroduced diluent.

The Smith et al. U.S. Pat. No. 3,250,757 discloses a method and apparatus for controlling feed to a polymerization reactor. According to the method disclosed, one or more of several feed streams, including recycle monomer stream, make up monomer stream, the combined monomer stream, and the diluent make-up stream, are controlled to maintain a substantially constant monomer concentration and total flow rate for the combined streams when employing a substantial recycle stream of unreacted monomer and diluent.

The Miller et al. U.S. Pat. No. 3,257,363 discloses a process for polymerization of 1-olefin reactant in a liquid phase in a reaction zone in the presence of a liquid hydrocarbon vehicle wherein a polymer product is formed the density of which is different than the density of the non-product phase or the resulting reaction mixture, and the flow rate of said vehicle passed to said zone is manipulated in response to the computed concentration of the product in the reaction mixture to maintain a predetermined concentration of the product in the reaction mixture. The improvement disclosed in this patent comprises measuring the density of the reaction mixture and producing a signal proportional thereto, analyzing the reaction mixture to determine the concentrations of the reactant and vehicle in the reaction mixture and producing a signal proportional thereto, and controlling the flow rate of the vehicle to the reaction zone in response to the latter signal to maintain a predetermined concentration of the product in the reaction mixture.

The Smith et al. U.S. Pat. No. 3,356,667 discloses control of polypropylene polymer quality by establishing a first output signal representative of hydrogen concentration in the feed to the polymerization zone, establishing a second output signal representative of the percent solids (polymer solids) in the reaction zone, establishing a third output signal representative of the rate of flow of monomer to the polymerization reaction zone, establishing a fourth output signal representative of the temperature of the reaction mixture within the reaction zone, producing a first control output signal representative of the instantaneous polymer melt index in the reaction mixture in the reaction zone, and varying the rate of hydrogen addition to the reaction zone in response to changes in the thus-determined polymer melt index (instantaneous) which is equivalent to the MFR.

The Smith et al. U.S. Pat. No. 3,476,729 discloses a polymerization process control and apparatus therefor. The amount of modifier added to a polymerizable monomer stream is controlled by sampling the concentration of the modifier in the monomer stream, generating a signal representative of this concentration, and regulating the flow of the added monomer in response to this signal so as to maintain the concentration of the modifier in the monomer stream at a predetermined level. The regulation of the modifier flow is maintained independent of any pressure fluctuations in the polymerization system.

The Miller U.S. Pat. No. 3,494,283 discloses a method for control of chemical reactions. In a polymerization system, the actual density of the reaction mixture is measured and the concentration of the polymer in the reaction mixture is determined. In one embodiment, a signal representative of the density which the reaction mixture would have with the determined polymer concentration and the desired monomer concentration is established and compared with the actual density to obtain a control signal for the manipulation of the monomer flow rate to the reactor to maintain the actual monomer concentration substantially at the desired value therefor. In a second embodiment, the actual monomer concentration is determined and compared with the desired monomer concentration to obtain the control signal. The desired monomer concentration and desired reaction temperature can be established responsive to the desired values of melt flow rate and melt index of the polymer to be produced.

The Delbouille et al. U.S. Pat. No. 3,551,403 discloses a process for the regulation of the polymerization of gaseous olefins in a reactor operating continuously at a low pressure and in the presence of a diluent, a polymerization catalyst and a chain transfer agent. The process which is carried out under constant condition of temperature and pressure and with substantially constant concentrations is regulated by immediately adjusting the olefin input flow into the reactor in response to a variation in the gaseous output from the process and then adjusting the input flow of catalyst in the reactor to return the input flow of olefin to its initial value. An apparatus for carrying out the method includes a continuous type reactor, a separator communicating with the reactor, means for maintaining constant conditions in the reactor and separator and means for adjusting the concentrations of olefin and catalyst in the reactor in response to the gaseous outflow from the separator.

The Smith U.S. Pat. No. 3,614,682 discloses digital computer control of a polymerization process by determining the value of a process variable, generating and storing digital signals corresponding to numerical values of the process variables, storing a program for controlling the process, and periodically executing the program.

The Smith et al. U.S. Pat. No. 3,951,604 discloses a polymerization system having first and second feed streams, diluent and recycled diluent streams and a modifier stream controllably fed to a reactor, a resultant product stream is passed from the reactor and a gas stream is removed from the resultant bottoms product of the reactor. The gas stream is analyzed and signals are delivered in response to the analysis. The signals are modified and compared to a modified signal responsive to one of the flow rates of the recycled diluent stream or the second feed stream that has been modified by the flow rate of the diluent stream for providing a resultant control signal for relatively controlling the flow of the modifier stream.

The Buss et al. U.S. Pat. No. 3,998,995 describes polyethylene polymerization in a "tubular reactor" in which the monomer flow to the reaction zone is controlled to maintain a given polymer production rate. This patent teaches the determining of polymer formation rate by making a heat balance around the reactor. A control system determines the major monomer feed rate required to yield a desired polymer production rate. The major monomer feed rate is then set by and adjusted in response to this determination of monomer feed rate to maintain the heat balance determined production rate unless the major monomer concentration in the reactor increases beyond a predetermined high limit.

In contradistinction, the method and apparatus of the present invention, relate to a process to control the polymer slurry concentration in a stirred tank reactor for the polymerization of propylene by manipulating the diluent (hexane) feed to the reactor. The production rate and the monomer feed rate can vary, yet the slurry concentration adjusting the diluent feed to compensate for changes in production rate or monomer feed rate.

The Mori U.S. Pat. No. 4,469,853 describes a method to produce a polyolefin of a predetermined melt index (for polypropylene melt index is also known as melt flow rate) by maintaining the reactor temperature constant, detecting by gas chromatography the concentrations of the olefin and hydrogen in the gas phase and controlling the concentrations of olefin and hydrogen to produce a polyolefin of a given melt index.

In contradistinction, the method and apparatus of the present invention detect the concentrations of propylene and hydrogen and control the ratio of hydrogen concentration to propylene concentration at the measured temperature and pressure of the reactor in order to maintain the ratio at a desired value to control the melt flow of the polymer being produced. The reactor temperature or pressure can change since they are controlled by separate control loops, but the ratio of hydrogen to propylene is changed based on the measured reactor temperature and pressure to produce a given MFR polymer product.

SUMMARY OF THE INVENTION

The MFR of PP produced in a slurry reactor is a function of temperature and the ratio of hydrogen to propylene in the liquid phase. Unfortunately, it is impractical to measure the MFR or the composition of the liquid in a polypropylene slurry reactor. However, the vapor phase composition can be measured easily with a gas chromatograph. Since the liquid composition at equilibrium is determined by the vapor composition and the reactor pressure and temperature, MFR can be expressed as a function of pressure, temperature and vapor composition.

The relationship discussed above is utilized in practicing the method of the present invention for controlling MFR. According to the teachings of the present invention, a method to control MFR and a reactor control system are provided wherein the ratio of hydrogen to propylene in the vapor phase is maintained at a constant value by an analyzer controller for the hydrogen feed to the reactor. To maintain a constant MFR, the set point of the analyzer controller needs to be adjusted to compensate for changes in pressure or temperature. The method to control MFR and the reactor control system of the present invention make these adjustments automatically to maintain a desired MFR, utilizing a process simulation program which determines the hydrogen to propylene ratio required to produce polypropylene with a desired MFR at a measured pressure and temperature.

As with MFR, there is no practical way to measure SCON directly. However, SCON can be determined from a material balance calculation if the polymerization rate and flow rates of the reactor inlet streams are known. In presently utilized control strategies for controlling SCON, the hexane feed rate and/or operating conditions that affect the hexane content of the recycled stream are adjusted manually based on a polymerization rate determined by assuming a constant conversion of propylene to PP.

This method for determining the polymerization rate is adequate for long term (several reactor residence times) and averages out because losses are constant and unreacted propylene is recycled to the reactor. However, it does not adequately reflect short term fluctuations in the polymerization rate.

According to the teachings of the present invention, the instantaneous polymerization rate is calculated by an on-line computer program using an energy balance around the reactor. Then the program calculates the hexane feed rate required to maintain the desired SCON and automatically adjusts the set point of the flow controller for the hexane feed.

DESCRIPTION OF THE PREFERRED EMBODIMENT

Figure 1:
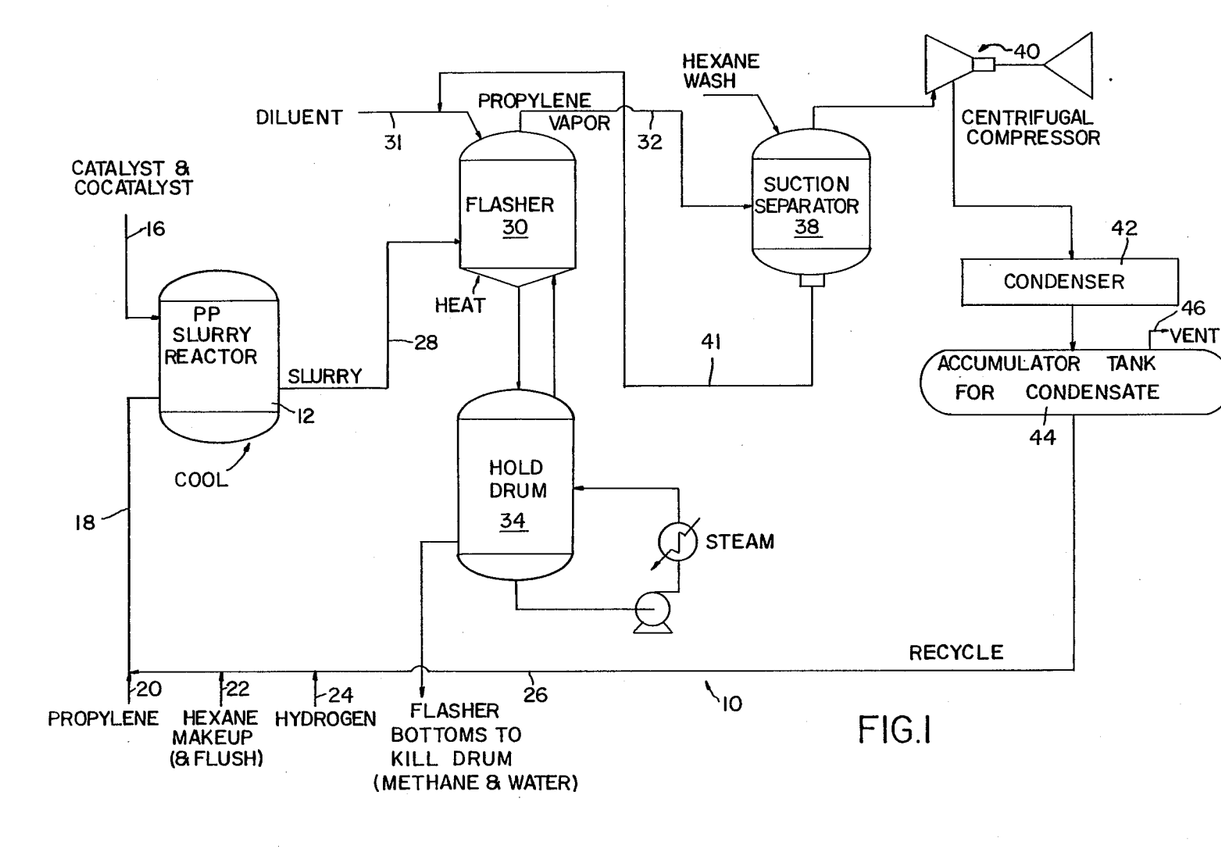
FIG. 1 is a block diagram of a polypropylene reactor system including a PP slurry reactor.

Referring now to the drawings in greater detail, and in particular to FIG. 1, there is illustrated therein a polypropylene reactor system 10. The polypropylene reactor system 10 includes a PP slurry reactor 12 which is cooled, such as with a cooling coil 14 shown in FIG. 2. Typically, the reactor 12 is a continuous stirred tank reactor.

An input line or stream 16 feeds a catalyst and a co-catalyst into the reactor 12 and another input stream 18 is a combination of input feed streams, namely the following streams: propylene 20, hexane makeup (and flush) 22, hydrogen 24, and recycle 26 which are combined and fed into the reactor 12.

The output of the reactor 12 is a slurry of polypropylene particles in a diluent mixture of hexane and unreacted propylene as the main components and minor components such as catalyst residues. This slurry is fed via stream 28 to a flasher tank 30 which also receives diluent (hexane) via an input stream 31. Heat is also supplied to the flasher tank 30. A vaporized mixture of propylene and hexane is extracted from the flasher tank 30 via an output line 32. Heavier liquid products and solids are fed to a hold drum 34 which is heated with steam. The bottoms from the flasher tank 30 which are received by the hold drum 34 are supplied to a kill drum (not shown).

In the meantime, the vaporized propylene-hexane mixture is supplied to a suction separator 38 which is also provided with a hexane wash. The clean vapor output from the suction separator 38 is supplied to a centrifugal compressor 40 while the liquid hexane containing traces of solids is recycled via stream 41 back to the diluent (hexane) input 31 to the flasher tank 30.

The high pressure vapor from the centrifugal compressor 40 is supplied to a condenser 42 and the condensate is accumulated in an accumulator tank 44 which has a vent 46 for other gases that might be present. The condensate mixture of propylene and hexane diluent is then supplied to the recycle stream 26 which is combined with the streams flowing to the reactor 12 in stream 18.

Figure 2:
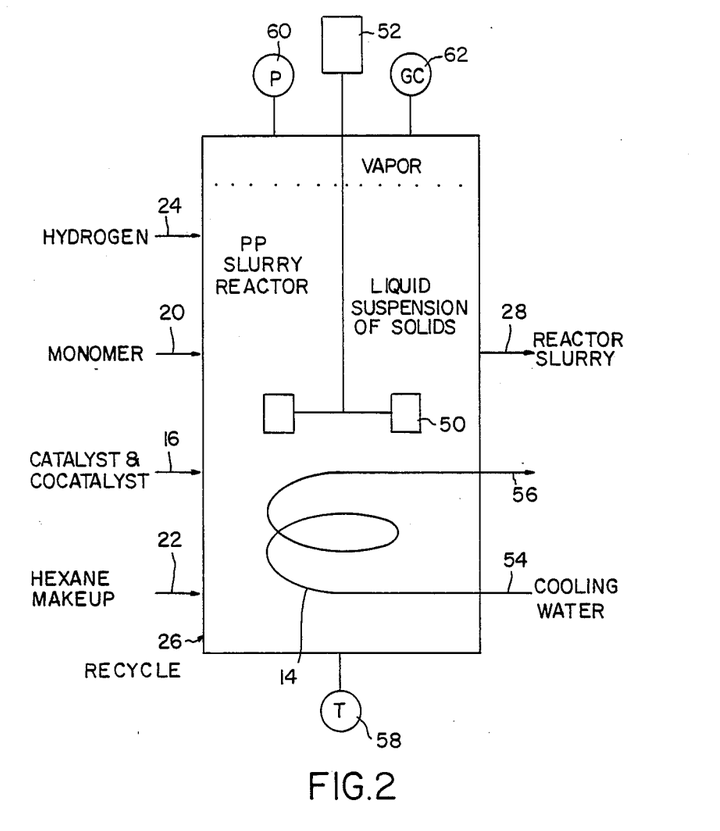
FIG. 2 is a block diagram of the PP slurry reactor shown in FIG. 1 and shows the input streams to the reactor, the cooling coil for the reactor, an agitator or stirrer in the reactor, a pressure sensor, a temperature sensor and a gas chromatograph coupled to the reactor.

Referring now to FIG. 2 which is an enlarged block diagram of the PP slurry reactor 12, it will be apparent that this reactor is of the stirred type having a stirrer or agitator 50 operated by a motor 52.

The input streams to the reactor 12 are shown as being separate inputs, although they can be combined as shown in FIG. 1 or can be separate as shown in FIG. 2. In this respect, reference is made to the hydrogen input stream 24, the monomer or propylene input stream 20, the catalyst and co-catalyst input stream 16, the hexane makeup input stream 22 and the recycle input stream 26.

The reactor slurry is a suspension of solid particles of polypropylene in a liquid mixture consisting of hexane diluent and propylene monomer.

The reaction that takes place in the reactor 12 is an exothermic (heat-evolving) polymerization. To control the temperature and the production rate of solid polymer suspended in liquid diluent, the cooling coil 14 in reactor 12 is provided a supply of cooling water via input stream 54 and output stream 56 which removes the heat of reaction.

As will be described in greater detail hereinafter, it is desirable to keep the solids content of the slurry as high as possible to conserve diluent. For this purpose, and in accordance with the teachings of the present invention, the reactor as shown in FIG. 2 has a temperature sensor 58, a pressure sensor 60, and one or more gas chromatographs 62 which are operative to sense and measure parameters of the reaction. Also, conventional temperatures and volumetric flow sensors (not shown) are provided in the input lines 16, 20, 22, 24 and 26 and the cooling water input and output lines 54 and 56, to enable measurements to be made of the particular stream temperature and volumetric flow rate, and to enable calculations to be made of the density and mass flow of the particular stream. Then a process computer 64 (FIG. 3) monitors or calculates the following parameters: (1) reactor temperature, (2) temperatures, densities, and flow rates of the reactor inlet streams, (3) temperatures and flow rates of the reactor cooling water stream, (4) electric power used by the reactor agitator motor 52. The program within the process computer (PC) 64, which can be of the type sold by Hewlett Packard as an HP A-900 computer, then calculates the instantaneous polymerization rate from a reactor energy balance and uses this value to calculate the slurry concentration (SCON) from a reactor material balance. If the calculated SCON is not within a specified target range, the program calculates the hexane feed rate (stream 22) required for the target SCON to be obtained at the measured conditions and resets the set point (SP) of a flow controller (FC) 66 (FIG. 3) to the required hexane feed rate. The current hexane feed rate is sensed by a flow transmitter (FT) 68.

Figure 3:
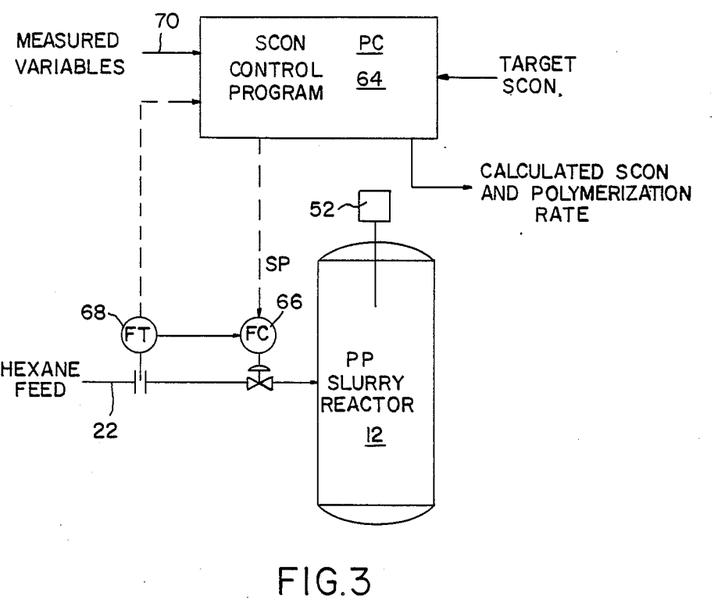
FIG. 3 is block diagram of the PP slurry reactor showing only the hexane feed input stream or line and a computer based processor controller which is coupled to a flow controller in the hexane feed input stream.

This procedure is more clearly illustrated in FIG. 3 where the measured variables supplied at an input 70 to the process computer 64 or calculated in the process computer 64 are the variables stated above, namely, reactor temperature; temperatures, densities, and flow rates of the reactor inlet streams; temperatures and flow rates of the reactor cooling water stream; and electric power used by the agitator or stirrer motor 52.

An energy balance around the reactor is made so that the heat removed by the cooling coils equals the heat generated by the exothermic polymerization reaction, after making appropriate adjustments for the heat (enthalpy) content of all inlet and outlet streams and mechanical work of agitation. The polypropylene production rate is calculated from the adjusted rate of heat release divided by the known heat of polymerization per unit of polypropylene produced.

The material balance around the reactor determines the liquid slurry out in kgs/hr. Measured liquid in minus calculated product equals liquid out. Then the slurry concentration is calculated from the following equation:

$$SCON = 100 \times \frac{\text{Solids Out}}{\text{Liquid Out + Solids Out}} \text{ (wt. \%)}$$

According to the teachings of the present invention, the method for controlling a polypropylene slurry process having a reactor with input and output streams and an agitator with a motor to obtain a desired slurry concentration in the reactor comprises: making an energy balance calculation around the reactor including, (a) measuring a temperature and a volumetric flow rate for each input and output stream, (b) determining if the measured temperature and the volumetric flow rate of each input and output stream is valid, (c) calculating a density and a heat capacity for each input and output stream using the corresponding measured temperature of each input and output stream, (d) calculating a mass flow and an enthalpy for each input and output stream, calculating a heat generated by the reaction from the energy calculation, calculating a production rate of polypropylene from the the calculated generated heat and the heat of polymerization per unit of polypropylene produced, calculating a material balance around the reactor from the calculated mass flows of each input and output stream, calculating a slurry concentration from the calculated material balance and the calculated production rate of polypropylene, calculating an amount of diluent required for the desired slurry concentration related to a desired rate of polypropylene production, and adjusting a flow controller in a diluent input stream to obtain the desired slurry concentration. The energy balance calculation may further include the step of measuring the energy used by the agitator motor and including that energy in the energy balance calculation. The method of controlling the desired slurry concentration as described above further including hexane as the diluent and input streams into the slurry reactor including a monomer input stream, a catalyst input stream, a diluent input stream; a cooling water input stream to a cooling coil associated with the slurry reactor; and the output streams include a reactor slurry output stream and a cooling water output stream from the cooling coil.

Figure 4:
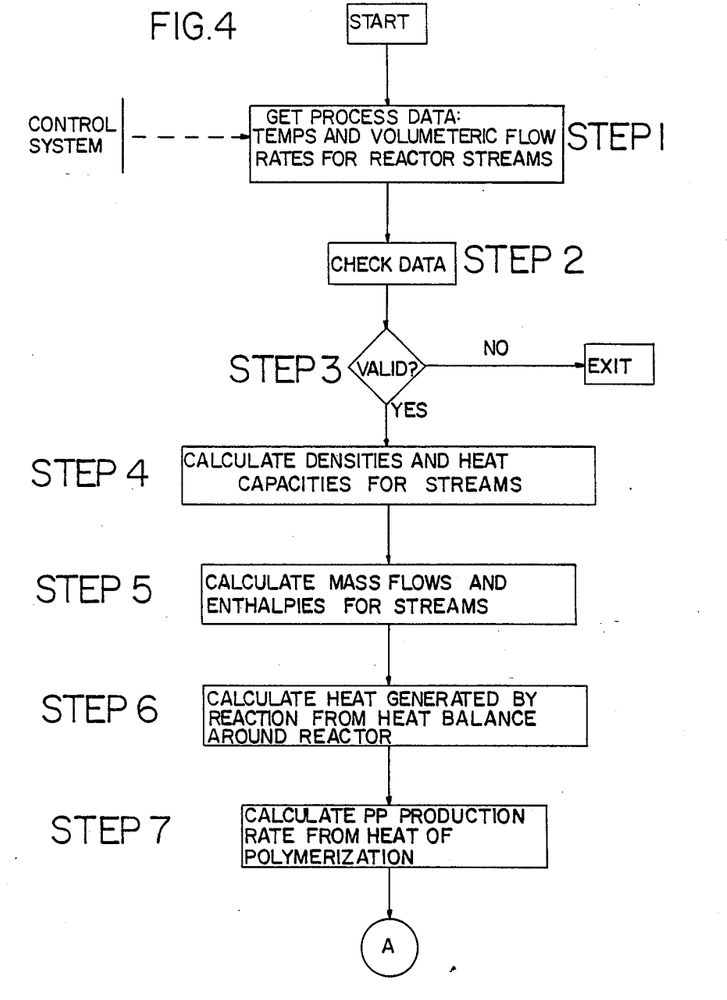
FIGS. 4 and 5 are a flow chart of the program or routine carried out by the process controller shown in FIG. 3 for controlling slurry concentration.
Figure 5:
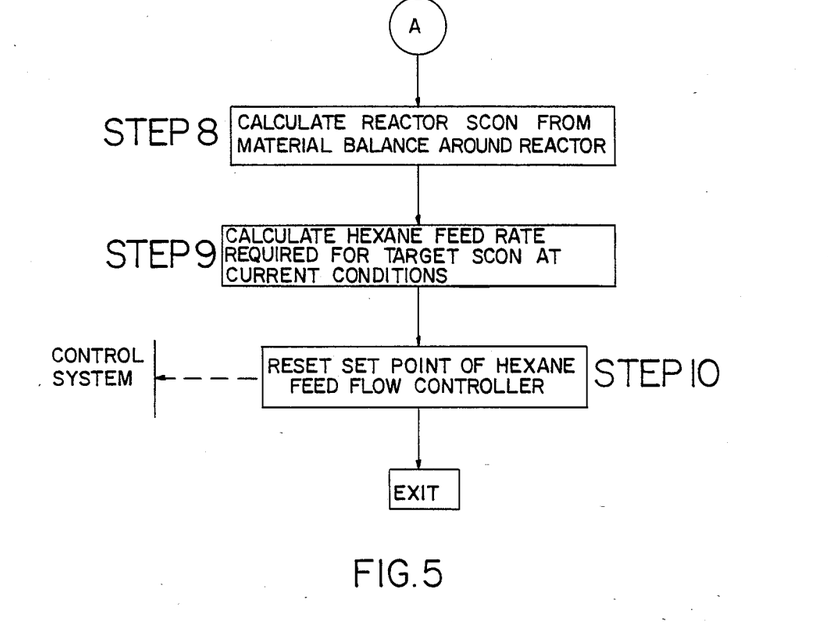

FIGS. 4 and 5 illustrate that to control SCON the program in the process computer 64 follows this routine after it is started:

At STEP 1, obtain process data and the temperature and volumetric flow rates for the reactor streams.

At STEP 2, a determination is made whether or not the data are valid.

At STEP 3, if the data are not valid the program exits and starts over in a predetermined time sequence. If the data are valid, go to STEP 4.

At STEP 4, calculate densities and heat capacities for the streams.

At STEP 5, calculate mass flows and enthalpies for the various streams.

At STEP 6, calculate the heat generated by the reaction from the heat balance around the reactor 12.

At STEP 7, calculate the polypropylene production rate from the heat of polymerization and the heat generated by the reaction.

At STEP 8, calculate the reactor slurry concentration (SCON) from the material balance around the reactor 12.

At STEP 9, calculate the hexane feed rate required for a target slurry concentration set by the operator at the current conditions of temperatures and flow rates.

At STEP 10, reset the set point for the rate of hexane being fed into the reactor 12 controlled by the hexane feed flow controller 66.

Then the program exists and starts over in a predetermined time sequence.

The apparatus for controlling a polypropylene slurry process having a reactor with input and output streams and an agitator with a motor to obtain a desired slurry concentration in the reactor comprises: a means for making an energy balance calculation around the reactor including;

(a) means for measuring a temperature and a volumetric flow rate for each input and output stream, (b) means for determining if the measured temperature and the volumetric flow rate of each input and output stream is valid, (c) means for calculating a density and a heat capacity for each input and output using the corresponding measured temperature of each input and output stream, (d) means for calculating a mass flow and an enthalpy for each input and output stream, a means for calculating a heat generated by reaction from the energy balance calculation, a means for calculating a production rate of polypropylene from the calculated generated heat and the heat of polymerization per unit of polypropylene produced, a means for calculating a material balance around the reactor from the calculated mass flows of each input and output stream, a means for calculating a slurry concentration from the calculated material balance and the calculated production rate of polypropylene, a means for calculating an amount of diluent required for the desired slurry concentration related to a desired rate of polypropylene production; and a means for adjusting a flow controller in a diluent input stream to obtain the desired slurry concentration. In the apparatus for controlling slurry concentration as described above, a means for calculating the energy used by the agitator motor and a means for including that energy in the energy balance calculation is further included. The apparatus also includes a cooling coil associated with the reactor and input streams into the reactor of a hydrogen input stream, a monomer input stream, a catalyst input stream, a diluent input stream: a cooling water input stream to the cooling coil associated with the slurry reactor: and the output streams include a reactor slurry output stream and a cooling water output stream from the cooling coil.

Figure 6:
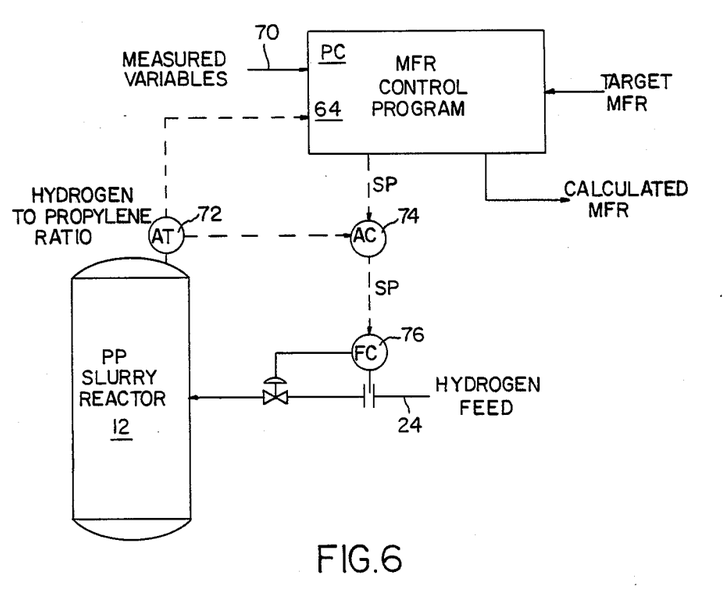
FIG. 6 is a block diagram of the PP slurry reactor and the process controller shown in FIGS. 2 and 3 and shows the process controller connected to an analyzer controller which in turn is connected to a flow controller in the hydrogen feed input stream or line.

FIG. 6 shows the reactor 12 with the process computer (PC) 64 connected thereto and shows other devices of the apparatus of the present invention for controlling melt flow rate (MFR) in accordance with the teachings of the present invention, namely an analyzer transmitter (AT) 72 and an analyzer controller (AC) 74. In this respect, it will be noted that measured variables from the reactor 12 are supplied to the process computer 64 via input line 70. These measured variables are: reactor pressure, reactor temperature, and the ratio of hydrogen to propylene in the vapor phase, which are obtained from the temperature sensor 58, the pressure sensor 60, and the gas chromatograph 62, respectively as shown in FIG. 2. The gas chromatograph 62 is connected to the analyzer transmitter 72 (shown in FIG. 6), shown in FIG. 2. The signals generated by these sensors are supplied to the process computer 64.

A program in the process computer 64 then calculates the MFR of the PP being produced from correlations previously developed from experimental results.

If the calculated MFR is not within a specified target range, the program calculates the hydrogen to propylene ratio required to produce the target MFR at the measured pressure and temperature and resets the set point (SP) of the analyzer controller (AC) 74 that is coupled to the analyzer transmitter (AT) 72 that measures the ratio of hydrogen to propylene. The analyzer controller 74 can be a Honeywell TDC 3000 controller and is coupled to a flow controller (FC) 76 for the hydrogen feed input stream 24, as shown in FIG. 6.

Typically the program will use an algorithm which can be defined as follows:

$$ln(MFR) = a + b/T + c \, ln(RL)$$

where RL is the mole ratio of hydrogen to propylene in the liquid phase, T is the temperature in °C. and a, b and c are constants which are functions of the characteristics of the catalyst employed, which is typically a Ziegler-Natta transition metal catalyst.

In order to calculate the liquid composition ratio of RL, phase equilibrium is assumed between the vapor and liquid phases in the reactor and a direct calculation of the liquid composition is obtained from the measured temperature and pressure of the reactor together with the vapor phase hydrogen and propylene compositions measured by the gas chromatograph.

The present invention is a method for controlling a polypropylene slurry process having a reactor with a vapor phase and a liquid phase to obtain a polypropylene with a desired melt flow rate comprising, measuring the temperature of the liquid phase and producing a first measurement signal proportional thereto, measuring the pressure of the vapor phase and producing a second measurement signal proportional thereto, determining a ratio of hydrogen concentration to propylene concentration in the vapor phase and producing a third measurement signal proportional thereto, automatically combining the first, second and third measurement signals to produce a computed output signal to determine an instantaneous melt flow rate of the polypropylene being produced in the reactor in response to the first, second and third measurement signals, comparing the determined instantaneous melt flow rate with the desired melt flow rate of the polypropylene, and adjusting the ratio of hydrogen concentration to propylene concentration in the vapor phase so as to maintain the ratio at a desired value to produce polypropylene with the desired melt flow rate. The ratio of hydrogen concentration to propylene concentration in the vapor phase can be adjusted by adjusting the flow rate of hydrogen fed into the reactor.

Figure 7:
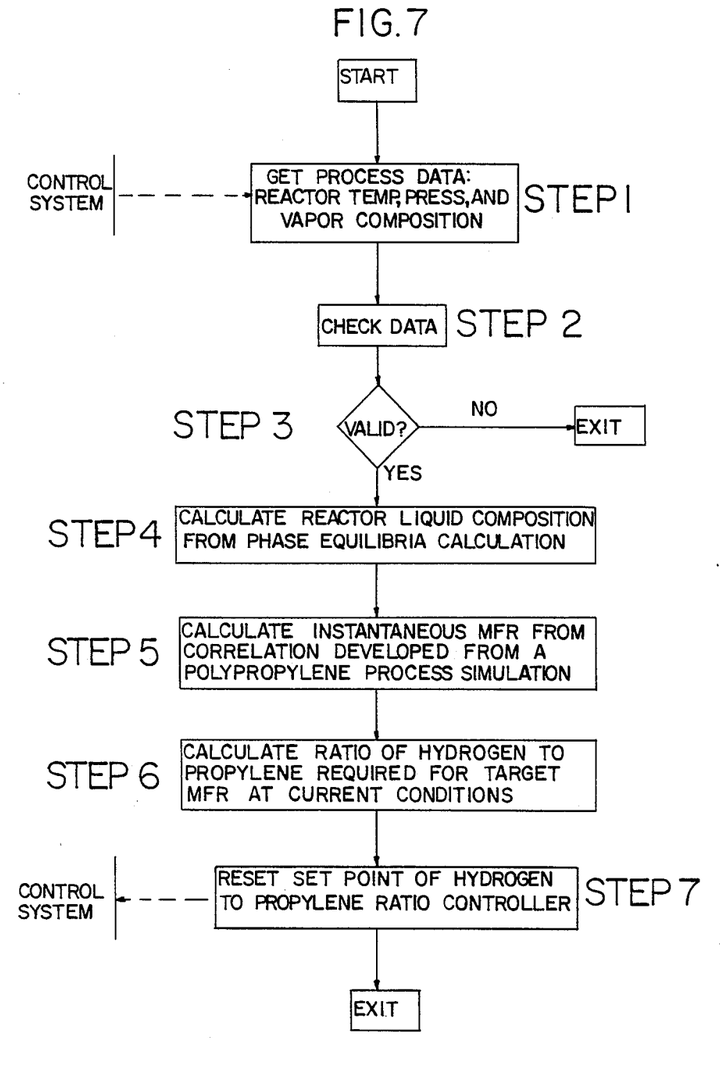
FIG. 7 is a flow chart of the program or routine carried out by the process controller for controlling the ratio of hydrogen to propylene in the PP slurry reactor to control the melt flow rate of the polypropylene product.

As shown in FIG. 7, the program for controlling melt flow rate relative to a calculated ratio of hydrogen to propylene as follows:

After starting the program, the program goes to STEP 1.

At STEP 1, the process data of reactor temperature, pressure and vapor composition are obtained.

At STEP 2, a determination is made whether or not the data are valid.

At STEP 3, if the data are not valid, the program exits and starts over in a predetermined time sequence. If the data are valid, go on to STEP 4.

At STEP 4, the reactor liquid composition is calculated from the phase equilibria calculation.

At STEP 5, the instantaneous MFR is calculated from a correlation developed from experimental results.

At STEP 6, the ratio of hydrogen to propylene required to obtain a target MFR at the current conditions of temperature and pressure is calculated.

At STEP 7, the set point of hydrogen to propylene to obtain the desired MFR is then reset in the ratio or analyzer controller AC.

Then the program exits and starts over in a predetermined time sequence.

The apparatus of the present invention for controlling a polypropylene slurry process having a reactor with a vapor phase and a liquid phase to obtain a polypropylene with a desired melt flow rate comprises: a means for measuring the temperature of the liquid phase and producing a first measurement signal proportional thereto, a means for measuring the pressure of the vapor phase and producing a second measurement signal proportional thereto, a means for determining a ratio of hydrogen concentration to propylene concentration in the vapor phase and producing a third measurement signal proportional thereto, a means for automatically combining the first, second and third measurement signals to produce a computed output signal to determine an instantaneous melt flow rate of the polypropylene being produced in the reactor in response to the first, second and third measurement signals, a means for comparing the determined instantaneous melt flow rate with the desired melt flow rate of the polypropylene, and means for adjusting the ratio of hydrogen concentration to propylene concentration in the vapor phase so as to maintain the ratio at a desired value to produce polypropylene with the desired melt flow rate. The means for adjusting the ratio of hydrogen concentration to propylene concentration includes a means for adjusting the flow rate of hydrogen fed into the reactor. The measuring means include a temperature sensor and a pressure sensor, the determining means include a gas chromatograph and transmitter coupled to said reactor, and the automatic combining means include a process computer. The adjusting means include a process computer, an analyzer controller and a flow controller in the hydrogen input stream to the reactor.

The present invention for reactor control of a polypropylene slurry process, particularly control of SCON and MFR, has a number of advantages, some of which are explicitly described above, and others of which are inherent in the invention.

We claim:

1. A method for controlling a polypropylene slurry process having a reactor with a vapor phase and a liquid phase to obtain a polypropylene with a desired melt flow rate comprising:
   measuring the temperature of the liquid phase and producing a first measurement signal proportional thereto;

measuring the pressure of the vapor phase and producing a second measurement signal proportional thereto;

determining a ratio of hydrogen concentration to propylene concentration in the vapor phase and producing a third measurement signal proportional thereto;

automatically combining the first, second and third measurement signals to produce a computed output signal to determine an instantaneous melt flow rate of the polypropylene being produced in the reactor in response to the first, second and third measurement signals;

comparing the determined instantaneous melt flow rate with the desired melt flow rate of the polypropylene; and adjusting the ratio of hydrogen concentration to propylene concentration in the vapor phase so as to maintain the ratio at a desired value to produce polypropylene with the desired melt flow rate.

2. The method of claim 1 wherein the step of adjusting the ratio of hydrogen concentration to propylene concentration in the vapor phase includes the step of adjusting the flow rate of hydrogen fed into the reactor.

3. A method for controlling a polypropylene slurry process having a reactor with input and output streams and an agitator with a motor to obtain a desired slurry concentration in the reactor comprising:

making an energy balance calculation around the reactor including;

(a) measuring a temperature and a volumetric flow rate for each input and output stream, (b) determining if the measured temperature and the volumetric flow rate of each input and output stream is valid, (c) calculating a density and a heat capacity for each input and output stream using the corresponding measured temperature of each input and output stream, calculating a mass flow and an enthalpy for each input and output stream, calculating a heat generated by the reaction from the energy calculation;

calculating a production rate of polypropylene from the the calculated generated heat and the heat of polymerization per unit of polypropylene produced;

calculating a material balance around the reactor from the calculated mass flows of each input and output stream;

calculating a slurry concentration from the calculated material balance and the calculated production rate of polypropylene;

calculating an amount of diluent required for the desired slurry concentration related to a desired rate of polypropylene production; and adjusting a flow controller in a diluent input stream to obtain the desired slurry concentration.

4. The method of claim 3 further including the step of measuring the energy used by the agitator motor and including that energy in the energy balance calculation.

5. The method of claim 3 wherein said diluent is hexane.

6. The method of claim 3 wherein said input streams into the slurry reactor include a monomer input stream, a catalyst input stream, a diluent input stream; a cooling water input stream to a cooling coil associated with the slurry reactor; and the output streams include a reactor slurry output stream and a cooling water output stream from the cooling coil.

7. An apparatus for controlling a polypropylene slurry process having a reactor with a vapor phase and a liquid phase to obtain a polypropylene with a desired melt flow rate comprising:

means for measuring the temperature of the liquid phase and producing a first measurement signal proportional thereto;

means for measuring the pressure of the vapor phase and producing a second measurement signal proportional thereto;

means for determining a ratio of hydrogen concentration to propylene concentration in the vapor phase and producing a third measurement signal proportional thereto;

means for automatically combining the first, second and third measurement signals to produce a computed output signal to determine an instantaneous melt flow rate of the polypropylene being produced in the reactor in response to the first, second and third measurement signals;

means for comparing the determined instantaneous melt flow rate with the desired melt flow rate of the polypropylene, and means for adjusting the ratio of hydrogen concentration to propylene concentration in the vapor phase so as to maintain the ratio at a desired value to produce polypropylene with the desired melt flow rate.

8. The apparatus of claim 7 wherein said means for adjusting the ratio of hydrogen concentration to propylene concentration includes a means for adjusting the flow rate of hydrogen fed into the reactor.

9. The apparatus of claim 7 wherein said measuring means include a temperature sensor and a pressure sensor, said determining means include a gas chromatograph and transmitter coupled to said reactor, and said automatic combining means include a process computer.

10. The apparatus of claim 8 wherein said adjusting means include said process computer, an analyzer controller and a flow controller in the hydrogen input stream to the reactor.

11. An apparatus for controlling a polypropylene slurry process having a reactor with input and output streams and an agitator with a motor to obtain a desired slurry concentration in the reactor comprising:

means for making an energy balance calculation around the reactor including;

(a) means for measuring a temperature and a volumetric flow rate for each input and output stream, (b) means for determining if the measured temperature and the volumetric flow rate of each input and output stream is valid, (c) means for calculating a density and a heat capacity for each input and output using the corresponding measured temperature of each input and output stream, (d) means for calculating a mass flow and an enthalpy for each input and output stream, means for calculating a heat generated by reaction from the energy balance calculation;

means for calculating a production rate of polypropylene from the calculated generated heat and the heat of polymerization per unit of polypropylene produced;

means for calculating a material balance around the reactor from the calculated mass flows of each input and output stream;

means for calculating a slurry concentration from the calculated material balance and the calculated production rate of polypropylene;

means for calculating an amount of diluent required for the desired slurry concentration related to a desired rate of polypropylene production; and means for adjusting a flow controller in a diluent input stream to obtain the desired slurry concentration.

12. The apparatus of claim 11 further including means for calculating the energy used by the agitator motor and means for including that energy in the energy balance calculation.

13. The apparatus of claim 11 including a cooling coil associated with the reactor and the input streams into the reactor include a hydrogen input stream, a monomer input stream, a catalyst input stream, a diluent input stream; a cooling water input stream to the cooling coil associated with the slurry reactor; and the output streams include a reactor slurry output stream and a cooling water output stream from the cooling coil.

* * * * *